(No Model.) 4 Sheets—Sheet 1.

W. MINNIGH.
SEED GRADER AND CLEANER.

No. 396,887. Patented Jan. 29, 1889.

WITNESSES:

INVENTOR
W. Minnigh
BY Munn & Co.
ATTORNEYS (No Model.) 4 Sheets—Sheet 3.

W. MINNIGH.
SEED GRADER AND CLEANER.

No. 396,887. Patented Jan. 29, 1889.

WITNESSES:

INVENTOR,
W. Minnigh
BY Munn & Co
ATTORNEYS (No Model.) 4 Sheets—Sheet 4.

W. MINNIGH.
SEED GRADER AND CLEANER.

No. 396,887. Patented Jan. 29, 1889.

UNITED STATES PATENT OFFICE.

WILLIAM MINNIGH, OF BRADLEYTOWN, PENNSYLVANIA.

SEED GRADER AND CLEANER.

SPECIFICATION forming part of Letters Patent No. 396,887, dated January 29, 1889.

Application filed April 24, 1888. Serial No. 271,672. (No model.)

*To all whom it may concern:*

Be it known that I, WILLIAM MINNIGH, of Bradleytown, in the county of Venango and State of Pennsylvania, have invented a new and Improved Seed Grader and Cleaner, of which the following is a full, clear, and exact description.

My invention relates to a seed grader and cleaner, and has for its object to provide a simple and durable apparatus which will effectually remove the larger cockle from wheat and sort and grade the sound grain.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1:
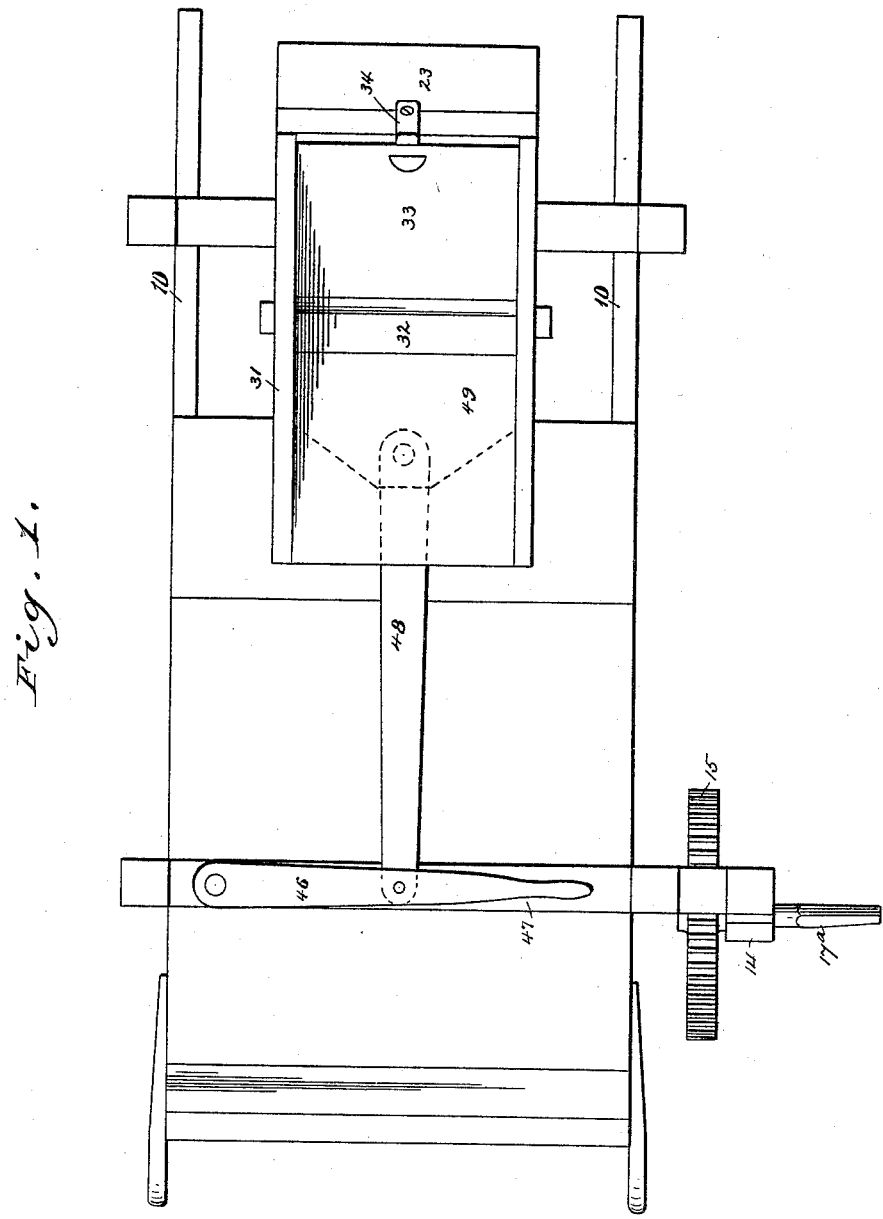
Figure 2:
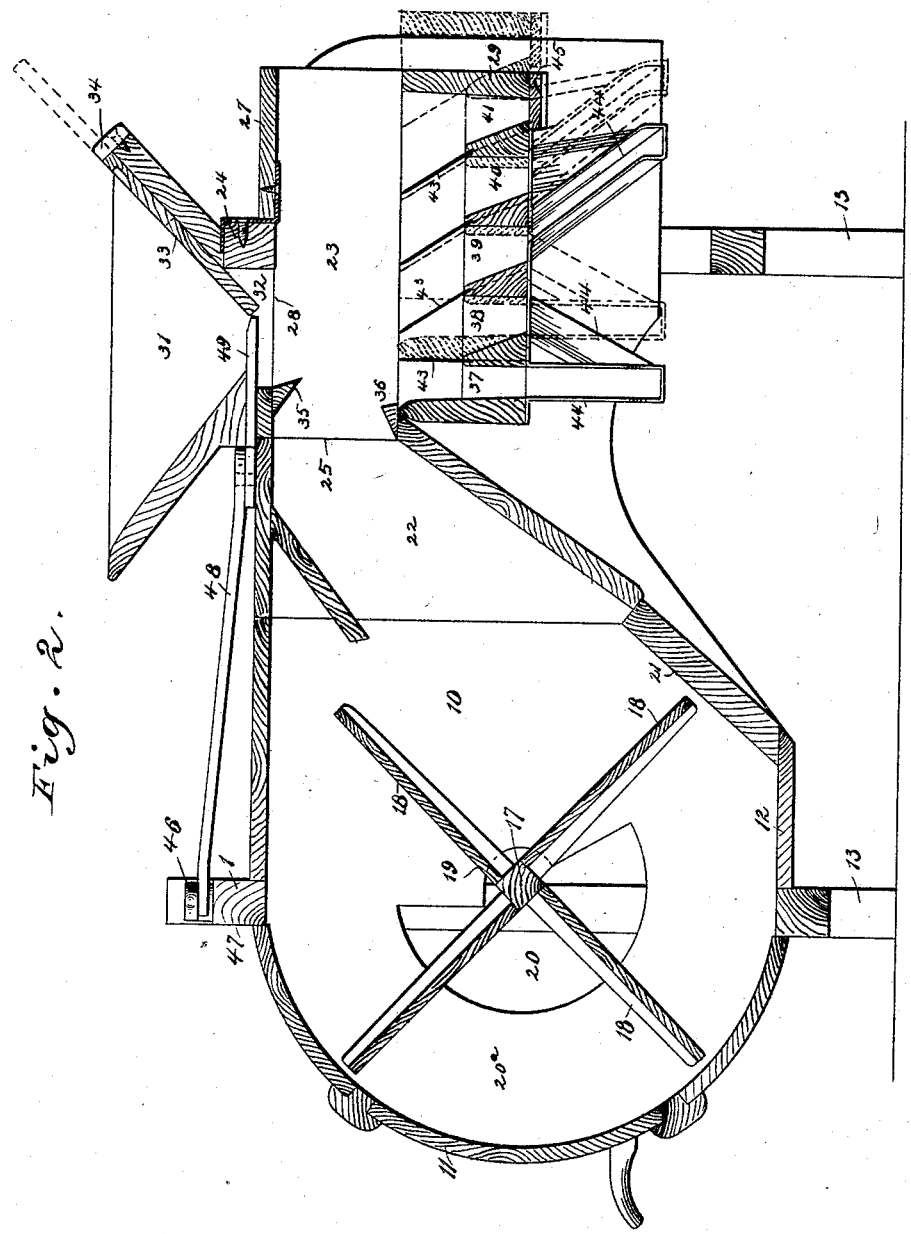
Figure 3:
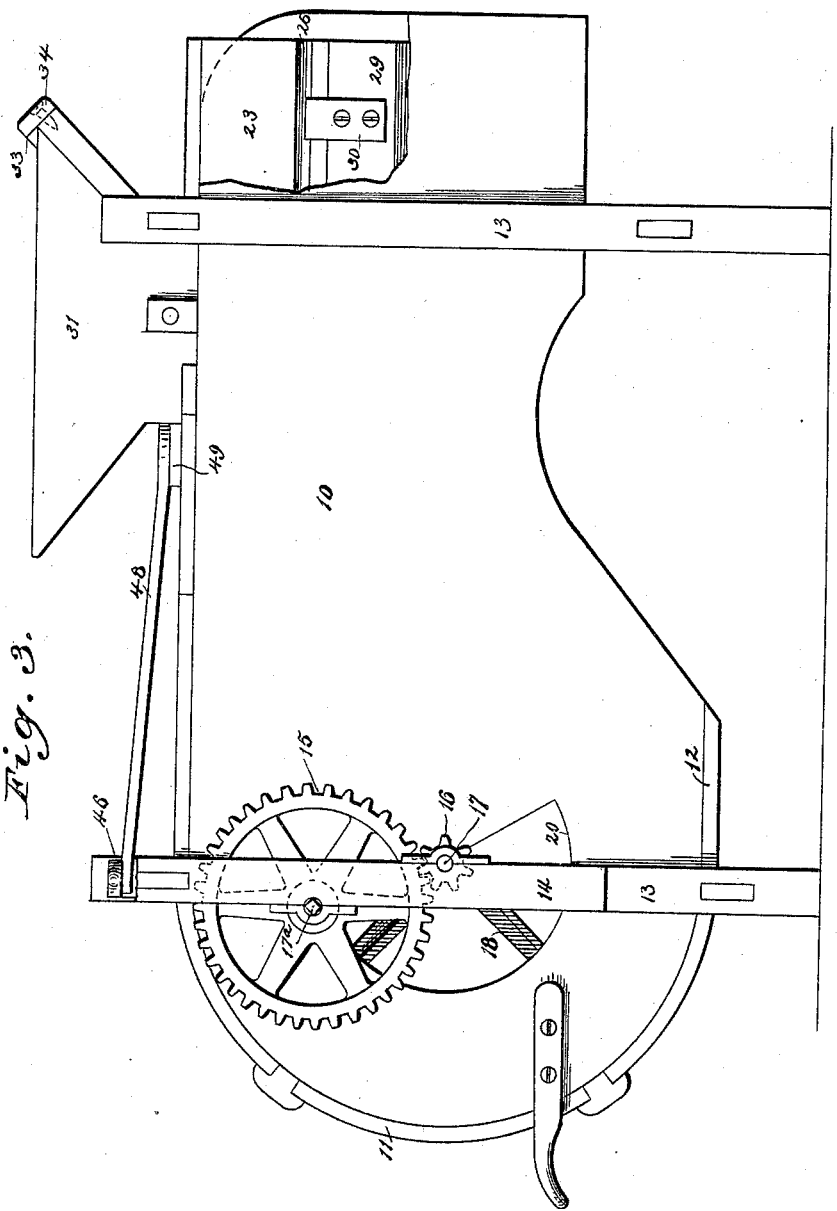
Figure 4:
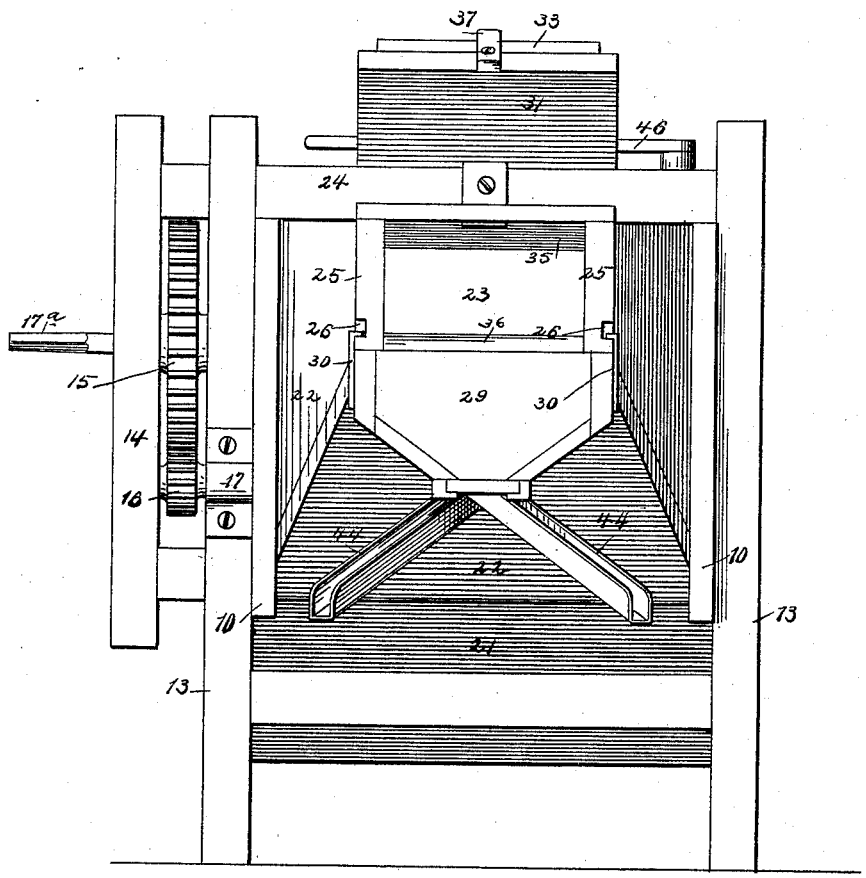

Figure 1 is a plan view of the apparatus. Fig. 2 is a central vertical and longitudinal section of the same. Fig. 3 is a side elevation, and Fig. 4 is an end view.

I aim by my device to provide a machine wherein a quantity of wheat may be passed through mixed with the worst of cockle and much cheat, and wherein the most favorable results will be obtained. For instance, when the grain is passed through the apparatus for the first time I aim to obtain at least one-quarter of the first grade and from one-third to one-half of the second grade, the third grade to consist of the majority of the cockle and the small grain, while the fourth grade will consist of broken grain and cockle, and a fifth grade of shriveled grain, small cockle, and cheat. This latter grade, however, I have found in practice will consist mostly or to a great extent of cheat only.

I aim, further, to so construct the machine that in the event of cockle being mixed with the grain of the first grade upon the first passage of said grain through the apparatus upon passing the grain of the first grade through a second time the cockle will be entirely separated therefrom.

In carrying out the invention the frame of the apparatus consists of the side pieces, 10, which for lightness and convenience are of less width at one end than at the other. The said side pieces at their widest ends are cylindrical and incased, as shown at 11, and provided with a short horizontal bottom board, 12. The frame is open at the opposite or rear end and supported by suitable perpendicular braced standards, 13, to which latter the side boards are secured in any suitable or approved manner.

To one of the rear standards a perpendicular bracket, 14, is fastened, and between said standard and the bracket a gear-wheel, 15, is pivoted on a short shaft, $17^a$, adapted to receive a crank-handle, the said gear being adapted to mesh with a pinion, 16, fastened upon the outer end of a shaft, 17.

The shaft 17, which is journaled in the rear standards, extending transversely from side to side of the frame, is provided with a series of attached blades, 18, of a length nearly equal to the space intervening the side boards, whereby a fan, 19, is obtained. The fan is supplied with air through apertures 20, produced in the said side boards.

The fan-chamber $20^a$ is completed by securing a second bottom board, 21, to the horizontal bottom board, 12, the former board having an inclination upward and rearward, as shown in Fig. 2. Upon the inclined bottom board, 21, a funnel-like chute, 22, is rested, which funnel is preferably detachably secured to the side boards and purposed to constitute a contracted passage for the air to a blast-trunk, 23, hereinafter described. The upper portion of the funnel 22, and likewise the upper portion of the fan-chamber, is inclosed, as shown in Fig. 1.

Upon the upper contracted end of the funnel the forward end of the blast-trunk 23 is supported, the connection between said funnel and trunk being practically air-tight. The opposite end of the air-trunk is projected horizontally rearward through the open end of the frame and sustained by means of an angle-arm secured to the top of the trunk and to the brace 24, connecting the rear standards. This form of support may, however, be dispensed with and any other suitable or equivalent means be substituted without departing from the spirit of the invention.

The blast-trunk consists of two parallel side pieces, 25, having each a longitudinal groove, 26, formed in the outer side near the bottom, and a top, 27, provided with an opening, 28, adapted for the reception of a hopper. The ends and bottom of the blast-trunk are open.

A sorting and grading chamber, 29, open at the top, closed at the ends, and having inclined sides and a narrow bottom, is adjustably supported from the blast-trunk by means of angle-arms 30, secured to the outer sides of the sorting-chamber or seed-receptacle, one member of which arms enters the grooves 26 of the blast-trunk, being adapted to slide therein, as best shown in Fig. 3.

A hopper, 31, is detachably secured upon the blast-trunk in any approved manner over the opening 28, which hopper is provided with a corresponding opening, 32, in the bottom, controlled by a gate, 33, sliding in the sides of the hopper. The gate 33 is not adapted to close the opening 32, as when carried downward as far as possible a narrow opening is still disclosed, as shown in Fig. 1. When the gate is in this position, its outer end is flush with the outer upper end of the hopper, and the opposing sides of said hopper are consequently smooth, as best shown in Fig. 2. The gate is held in this closed or normal position by means of a button, 34, pivoted upon the hopper, as shown in Fig. 1, or other equivalent device.

In order that the blast may not take a course upward through or in direction of the hopper-opening, a baffle-strip, 35, is secured transversely to the upper inner wall of the blast-trunk, near the blast-entrance, which strip is given an inclination from the top downward and rearward. By this means the entering blast is directed, essentially, to the bottom of the trunk, whereupon it passes horizontally beneath the hopper-opening and outward at the rear.

A base-strip, 36, having a forwardly-inclined face, is attached transversely at the under side of the trunk at the inlet-opening, as best shown in Fig. 2, being adapted to promote the easy entrance of the blast.

The sorting-chamber is provided with a series of compartments, 37, 38, 39, 40, and 41, as best illustrated in Fig. 2. These compartments are adapted for the reception of the several grades of stock, and are produced by placing transverse essentially-vertical partitions 42 in the lower portion of the sorting-chamber, which partitions are provided with extensions 43, consisting of metal blades extending from side to side of the receptacle flush with the upper edge.

The partition and extension forming the compartment 37 are vertical, this compartment being essentially beneath the hopper-opening. The remaining extensions are, however, inclined forward in direction of the hopper-opening, whereby a feather-edge only is presented to the flying grain, thus preventing the said grain from rebounding from the proper compartment in which it is designed to fall into another.

Each of the compartments 37, 38, 39, and 40 have communication with an offtake-chute, 44, which chutes are secured to the bottom of the sorting-chamber and project outward and downward therefrom, each alternate chute in a reverse direction. The compartment 41, which is adapted to contain tailings or cheat, is minus a chute, an outlet being supplied by covering the opening in the bottom with a sliding gate or door, 45.

In order to conveniently and expeditiously completely close the hopper-opening or minutely regulate the same, a lever, 46, is pivoted upon the front upper standard brace or cross-bar, 47, and to said lever one end of a rod, 48, is pivoted, the other end of said rod being rigidly secured to a horizontal regulating-blade or cut-off, 49. The cut-off blade 49 reciprocates beneath the hopper, sliding in a recess produced therein to that end, and also upon the upper side or roof of the fan-chamber.

In operation the grain is placed in the hopper, the fan is rotated, and the cut-off and gate are opened a suitable distance. The falling grain is now brought in contact with the blast, which carries the light cockles, cheat, and rubbish over the rear compartment, in which they fall, the heavier grain and cockles falling in the next inner compartment, while the solid grain falls almost perpendicularly downward into the innermost compartment.

If there should be any cockle with the grain in the compartments 37 and 38, by passing the contents through the hopper a second time the cockle will be distributed in other compartments and the grain in compartments by itself.

The object of adjusting the grading-chamber upon the trunk is that the inner end of the former may be carried near to or away from the hopper-opening, as the nature of the blast may demand. For instance, in grading oats the sorting-chamber must be adjusted backward about four inches. Then, again, in grading my wheat this fall, I wanted to take twelve bushels of first grade out of twenty-two; so I moved the chamber back about one and one-half inch and got twelve and one-half bushels of first-grade wheat, whereas if placed at its innermost position I would have received only about five bushels. The chamber must be adjusted for wheat of different weights, and in this adjustment accomplishes the same purpose as substitution of screens of different mesh in the class of cleaners using screens. I also separated clover and timothy seed very successfully with my machine by properly adjusting the sorting-chamber and the slides 33 49.

Having thus described my invention, what I claim as new, and desire to secure by Letters Patent, is—

1. The combination, with the casing and the fan, of a longitudinally-adjustable sorting-chamber having a series of compartments, the casing having an inlet in its top above the inner end of the said chamber, substantially as set forth.

2. The combination, with the fan and the bottomless air-trunk leading therefrom and provided with an inlet through its top for grain or seed to be treated, of the longitudinally-adjustable sorting-chamber under said trunk, and having a series of compartments, substantially as set forth.

3. A grain sorting and cleaning machine comprising the casing, the fan, the bottomless air-trunk leading therefrom, the longitudinally-adjustable sorting-chamber under the air-trunk, and having transverse compartments, and the hopper leading through the top of the air-trunk over the inner or front end of said chamber, the horizontal sliding gate 49 and the inclined sliding gate 33 meeting at their inner ends in the hopper-outlet, substantially as set forth.

4. The combination, with a blast-trunk, a grading receptacle adjustably supported from said trunk, a vertical transverse partition in said receptacle at the inner end, and a series of spaced essentially-inclined partitions adjacent to the vertical partition, and a hopper supported upon said trunk near the inner end, of a fan and a funnel-shaped conductor uniting the fan-chamber and trunk, substantially as shown and described.

5. The combination, with a blast-trunk, a grading-receptacle adjustably supported from said trunk, a vertical transverse partition in the receptacle at the inner end, and a series of adjacent essentially-inclined partitions, a hopper supported upon the trunk, and gates sliding upon the hopper at an angle to each other, of a vertical metal extension secured to the said vertical partition, similar extensions secured to the remaining partitions inclined in direction of the hopper-opening, a fan, a funnel-shaped conductor connecting the fan-chamber and trunk, a rearwardly-inclined baffle-plate secured to the upper inner surface of the trunk-entrance, and a forwardly-inclined guide-plate attached to the inner bottom surface of trunk below the baffle-plate, substantially as and for the purpose specified.

WILLIAM MINNIGH.

Witnesses:
J. A. DAWSON,
W. W. THOMPSON.